US011663863B2

(12) United States Patent
Manoukian et al.

(10) Patent No.: US 11,663,863 B2
(45) Date of Patent: May 30, 2023

(54) METHODS AND SYSTEMS FOR OPERATING A ROTORCRAFT

(71) Applicant: PRATT & WHITNEY CANADA CORP., Longueuil (CA)

(72) Inventors: Patrick Manoukian, Saint-Laurent (CA); Philippe Beauchesne-Martel, Brossard (CA); Stephen Mah, Brossard (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 503 days.

(21) Appl. No.: 16/657,695

(22) Filed: Oct. 18, 2019

(65) Prior Publication Data

US 2020/0388092 A1 Dec. 10, 2020

Related U.S. Application Data

(60) Provisional application No. 62/858,515, filed on Jun. 7, 2019.

(51) Int. Cl.
*G07C 5/12* (2006.01)
*B64D 43/00* (2006.01)
*G07C 5/08* (2006.01)

(52) U.S. Cl.
CPC ............ *G07C 5/12* (2013.01); *B64D 43/00* (2013.01); *G07C 5/0816* (2013.01)

(58) Field of Classification Search
CPC ......... G07C 5/12; G07C 5/0816; B64D 43/00
See application file for complete search history.

(56) References Cited

U.S. PATENT DOCUMENTS

| 5,948,023 | A  | 9/1999 | Evans et al. |
| 6,742,742 | B2 | 6/2004 | Claudet |
| 9,355,571 | B2 | 5/2016 | Rucci et al. |
| 10,059,460 | B2 | 8/2018 | Dauriac et al. |
| 10,337,409 | B2 | 7/2019 | Bedrine et al. |
| 10,358,231 | B2 | 7/2019 | Flotte et al. |

(Continued)

OTHER PUBLICATIONS

European Search Report dated Nov. 3, 2020 in EP application 20178831.2.

(Continued)

*Primary Examiner* — James J Lee
*Assistant Examiner* — Steven Vu Nguyen
(74) *Attorney, Agent, or Firm* — Norton Rose Fulbright Canada LLP

(57) ABSTRACT

The present disclosure provides methods and systems for operating a rotorcraft comprising a plurality of engines configured to provide motive power to the rotorcraft. The rotorcraft is operated in a first flight regime. A target output power range for at least one of the plurality of engines is determined, the target output power range associated with operating the rotorcraft in a second flight regime different from the first flight regime in which at least one first engine of the plurality of engines is operated in an active mode to provide motive power to the rotorcraft and at least one second engine of the plurality of engines is operated in a standby mode to provide substantially no motive power to the rotorcraft. A graphical representation of the target output power range for the second flight regime is produced via a flight display in a cockpit of the rotorcraft.

20 Claims, 7 Drawing Sheets

(56) References Cited

U.S. PATENT DOCUMENTS

| | | | |
|---|---|---|---|
| 2011/0202251 A1 | 8/2011 | Luppold | |
| 2013/0120165 A1* | 5/2013 | McCollough | G01C 23/00 |
| | | | 340/946 |
| 2013/0219905 A1 | 8/2013 | Marconi et al. | |
| 2016/0144971 A1 | 5/2016 | Vallart | |
| 2016/0237917 A1 | 8/2016 | Marconi et al. | |
| 2017/0131687 A1* | 5/2017 | Mercier-Calvairac | ....................... |
| | | | G05B 13/024 |
| 2017/0152055 A1 | 6/2017 | Mercier-Calvairac et al. | |
| 2017/0320586 A1 | 11/2017 | Boyd et al. | |
| 2018/0080378 A1* | 3/2018 | Alecu | F02C 6/02 |
| 2019/0017409 A1 | 1/2019 | Yardibi et al. | |
| 2019/0055004 A1 | 2/2019 | Schaeffer et al. | |
| 2021/0215106 A1* | 7/2021 | Castellani | F02C 9/58 |

OTHER PUBLICATIONS

European Patent Office, Communication pursuant to Article 94(3) EPC for European patent application No. 20178831.2, dated May 31, 2022.

* cited by examiner

METHODS AND SYSTEMS FOR OPERATING A ROTORCRAFT

CROSS-REFERENCE TO RELATED APPLICATIONS

This patent application claims priority of U.S. Provisional Application Ser. No. 62/858,515, filed on Jun. 7, 2019, the entire contents of which are hereby incorporated by reference.

TECHNICAL FIELD

The present disclosure relates generally to a multi-engine aircraft powerplant system, and more particularly to a mode of operation of an aircraft.

BACKGROUND OF THE ART

When operating aircraft with multiple engines, there may be certain portions of a mission that do not require both engines to be operating at full power. In cruising conditions, operating a single engine at a relatively high power, instead of multiple engines at lower power, may allow for better fuel efficiency. For example, one or more engine(s) are operated at high power, and one or more remaining engine(s) are operated in what is sometimes referred to as a "standby" mode. However, in certain circumstances, the operating parameters of the engine(s) may not be conducive to operating one or more of the engine(s) in a standby mode.

Therefore, improvements are needed.

SUMMARY

In accordance with a broad aspect, there is provided a method for operating a rotorcraft comprising a plurality of engines configured to provide motive power to the rotorcraft. The rotorcraft is operated in a first flight regime. A target output power range for at least one of the plurality of engines is determined, the target output power range associated with operating the rotorcraft in a second flight regime different from the first flight regime in which at least one first engine of the plurality of engines is operated in an active mode to provide motive power to the rotorcraft and at least one second engine of the plurality of engines is operated in a standby mode to provide substantially no motive power to the rotorcraft. A graphical representation of the target output power range for the second flight regime is produced via a flight display in a cockpit of the rotorcraft.

In another aspect, there is provided a system for operating a rotorcraft comprising a plurality of engines configured to provide motive power to the rotorcraft. The system comprises a processor and a non-transitory computer-readable medium having stored thereon program instructions. The program instructions are executable by the processor for: operating the rotorcraft in a first flight regime; determining a target output power range for at least one of the plurality of engines, the target output power range associated with operating the rotorcraft in a second flight regime different from the first flight regime in which at least one first engine of the plurality of engines is operated in an active mode to provide motive power to the rotorcraft and at least one second engine of the plurality of engines is operated in a standby mode to provide substantially no motive power to the rotorcraft; and producing, via a flight display in a cockpit of the rotorcraft, a graphical representation of the at target output power range for the second flight regime.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

There are described herein methods and systems for operating a multi-engine aircraft comprising a plurality of engines configured to provide motive power to the rotorcraft. Under certain conditions, it can be desirable to operate the aircraft in a so-called "asymmetric operating regime" (AOR), which is described in greater detail hereinbelow. When operated in the AOR, multiple engines of the aircraft, which may be a multi-engine helicopter or other rotorcraft, are operated at different output power levels.

Figure 1A:
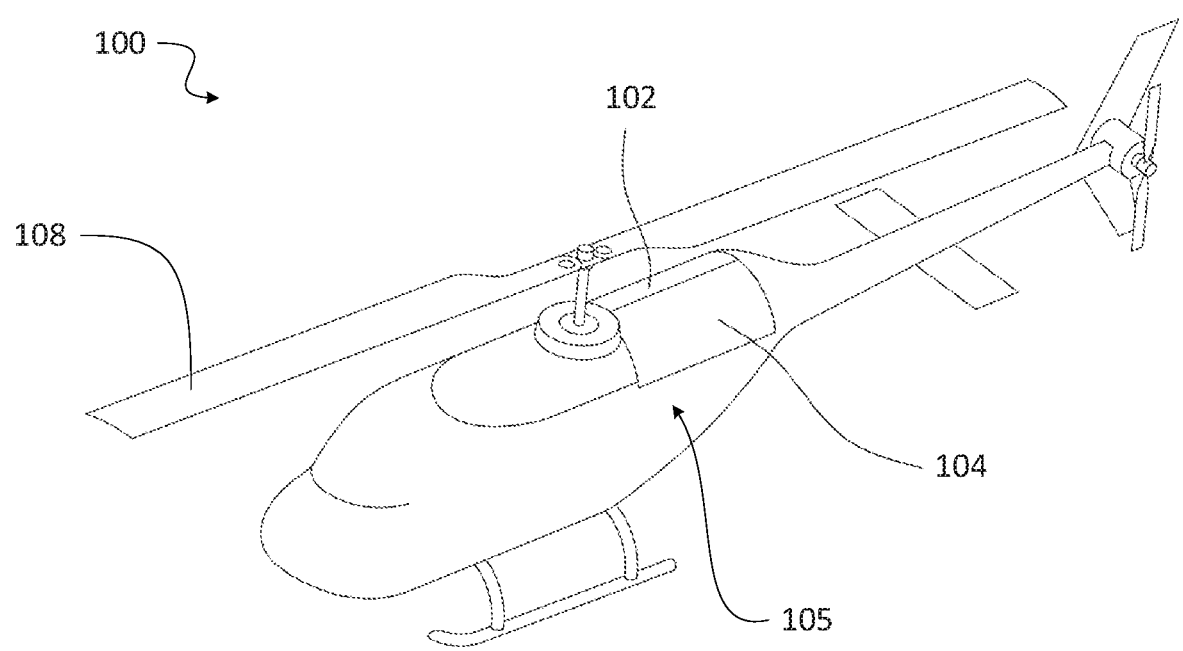
FIG. 1A is a schematic view of a multi-engine aircraft.

FIG. 1A depicts an exemplary multi-engine aircraft 100, which in this case is a helicopter. The aircraft 100 includes at least two gas turbine engines 102, 104. These two engines 102, 104 may be interconnected, in the case of the depicted helicopter application, by a common gearbox to form a multi-engine system 105, as shown in FIG. 1B, which drives a main rotor 108.

Figure 1B:
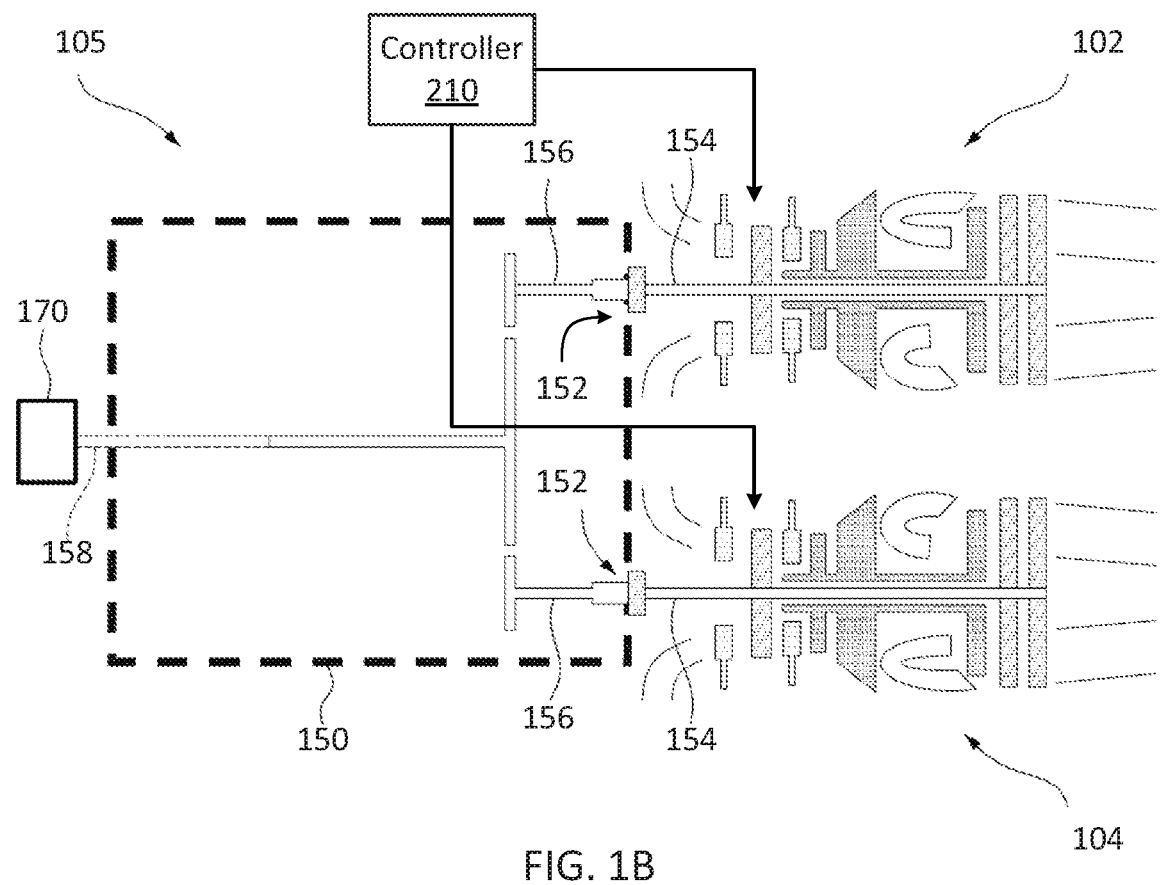
FIG. 1B is a schematic representation of an exemplary multi-engine system for the aircraft of FIG. 1A, showing axial cross-sectional views of two gas turbine engines.

Turning now to FIG. 1B, illustrated is an example multi-engine system 105 that may be used as a power plant for an aircraft, including but not limited to a rotorcraft such as the helicopter 100. The multi-engine system 105 may include two or more gas turbine engines 102, 104. In the case of a helicopter application, these gas turbine engines 102, 104 will be turboshaft engines. Control of the multi-engine system 105 is effected by one or more controller(s) 210, which may be FADEC(s), electronic engine controller(s) (EEC(s)), or the like, that are programmed to manage, as described herein below, the operation of the engines 102, 104 to reduce an overall fuel burn, particularly during sustained cruise operating regimes, wherein the aircraft is operated at a sustained (steady-state) cruising speed and altitude. The cruise operating regime is typically associated with the operation of prior art engines at equivalent part-power, such that each engine contributes approximately equally to the output power of the system 105. Other phases of a typical helicopter mission include transient phases like take-off, climb, stationary flight (hovering), approach and landing. Cruise may occur at higher altitudes and higher speeds, or at lower altitudes and speeds, such as during a search phase of a search-and-rescue mission.

More particularly, the multi-engine system 105 of this embodiment includes first and second turboshaft engines 102, 104 each having a respective transmission 152 which are interconnected by a common output gearbox 150 to drive a common load 170. In one embodiment, the common load 170 may comprise a rotary wing of a rotary-wing aircraft. For example, the common load 170 may be a main rotor 108 of the aircraft 100. Depending on the type of the common load 170 and on the operating speed thereof, each of turboshaft engines 102, 104 may be drivingly coupled to the common load 170 via the output gearbox 150, which may be of the speed-reduction type.

For example, the gearbox 150 may have a plurality of transmission shafts 156 to receive mechanical energy from respective output shafts 154 of respective turboshaft engines 102, 104. The gearbox 150 may be configured to direct at least some of the combined mechanical energy from the plurality of the turboshaft engines 102, 104 toward a common output shaft 158 for driving the common load 170 at a suitable operating (e.g., rotational) speed. It is understood that the multi-engine system 105 may also be configured, for example, to drive accessories and/or other elements of an associated aircraft. As will be described, the gearbox 150 may be configured to permit the common load 170 to be driven by either of the turboshaft engines 102, 104 or, by a combination of both engines 102, 104 together.

In the present description, while the aircraft conditions (cruise speed and altitude) are substantially stable, the engines 102, 104 of the system 105 may be operated asymmetrically, with one engine operated in a high-power "active" mode and the other engine operated in a lower-power (which could be no power, in some cases) "standby" mode. Doing so may provide fuel saving opportunities to the aircraft, however there may be other suitable reasons why the engines are desired to be operated asymmetrically. This operation management may therefore be referred to as an "asymmetric mode" or the aforementioned AOR, wherein one of the two engines is operated in a lower-power (which could be no power, in some cases) "standby mode" while the other engine is operated in a high-power "active" mode. In such an AOR, which is engaged for a cruise phase of flight (continuous, steady-state flight which is typically at a given commanded constant aircraft cruising speed and altitude). The multi-engine system 105 may be used in an aircraft, such as the helicopter 100, but also has applications in suitable marine and/or industrial applications or other ground operations.

Referring still to FIG. 1B, according to the present description the multi-engine system 105 is driving in this example the helicopter 100 which may be operated in the AOR, in which a first of the turboshaft engines (say, 102) may be operated at high power in an active mode and the second of the turboshaft engines (104 in this example) may be operated in a lower-power (which could be no power, in some cases) standby mode. In one example, the first turboshaft engine 102 may be controlled by the controller(s) 210 to run at full (or near-full) power conditions in the active mode, to supply substantially all or all of a required power and/or speed demand of the common load 170. The second turboshaft engine 104 may be controlled by the controller(s) 210 to operate at lower-power or no-output-power conditions to supply substantially none or none of a required power and/or speed demand of the common load 170. Optionally, a clutch may be provided to declutch the low-power engine. Controller(s) 210 may control the engine's governing on power according to an appropriate schedule or control regime. The controller(s) 210 may comprise a first controller for controlling the first engine 102 and a second controller for controlling the second engine 104. The first controller and the second controller may be in communication with each other in order to implement the operations described herein. In some embodiments, a single controller 210 may be used for controlling the first engine 102 and the second engine 104.

In another example, the AOR of the engines may be achieved through the one or more controller's 210 differential control of fuel flow to the engines, as described in pending application Ser. No. 16/535,256, the entire contents of which are incorporated herein by reference. Low fuel flow may also include zero fuel flow in some examples.

Although various differential control between the engines of the engine system 105 are possible, in one particular embodiment the controller(s) 210 may correspondingly control fuel flow rate to each engine 102, 104 accordingly. In the case of the standby engine, a fuel flow (and/or a fuel flow rate) provided to the standby engine may be controlled to be between 70% and 99.5% less than the fuel flow (and/or the fuel flow rate) provided to the active engine. In the AOR, the standby engine may be maintained between 70% and 99.5% less than the fuel flow to the active engine. In some embodiments of the method 60, the fuel flow rate difference between the active and standby engines may be controlled to be in a range of 70% and 90% of each other, with fuel flow to the standby engine being 70% to 90% less than the active engine. In some embodiments, the fuel flow rate difference may be controlled to be in a range of 80% and 90%, with fuel flow to the standby engine being 80% to 90% less than the active engine.

In another embodiment, the controller 210 may operate one engine (say 104) of the multiengine system 105 in a standby mode at a power substantially lower than a rated cruise power level of the engine, and in some embodiments at substantially zero output power and in other embodiments less than 10% output power relative to a reference power (provided at a reference fuel flow). Alternatively still, in some embodiments, the controller(s) 210 may control the standby engine to operate at a power in a range of 0% to 1% of a rated full-power of the standby engine (i.e. the power output of the second engine to the common gearbox remains between 0% to 1% of a rated full-power of the second engine when the second engine is operating in the standby mode).

In another example, the engine system 105 of FIG. 1B may be operated in an AOR by control of the relative speed of the engines using controller(s) 210, that is, the standby engine is controlled to a target low speed and the active engine is controlled to a target high speed. Such a low speed operation of the standby engine may include, for example, a rotational speed that is less than a typical ground idle speed of the engine (i.e. a "sub-idle" engine speed). Still other control regimes may be available for operating the engines in the AOR, such as control based on a target pressure ratio, or other suitable control parameters.

Although the examples described herein illustrate two engines, AOR is applicable to more than two engines, whereby at least one of the multiple engines is operated in a low-power standby mode while the remaining engines are operated in the active mode to supply all or substantially all of a required power and/or speed demand of a common load.

In use, the first turboshaft engine (say 102) may operate in the active mode while the other turboshaft engine (say 104) may operate in the standby mode, as described above. During operation in the AOR, if the helicopter 100 needs a power increase (expected or otherwise), the second turboshaft engine 104 may be required to provide more power relative to the low power conditions of the standby mode, and possibly return immediately to a high- or full-power condition. This may occur, for example, in an emergency condition of the multi-engine system 105 powering the helicopter 100, wherein the "active" engine loses power the power recovery from the lower power to the high power may take some time. Even absent an emergency, it will be desirable to repower the standby engine to exit the AOR.

Figure 2:
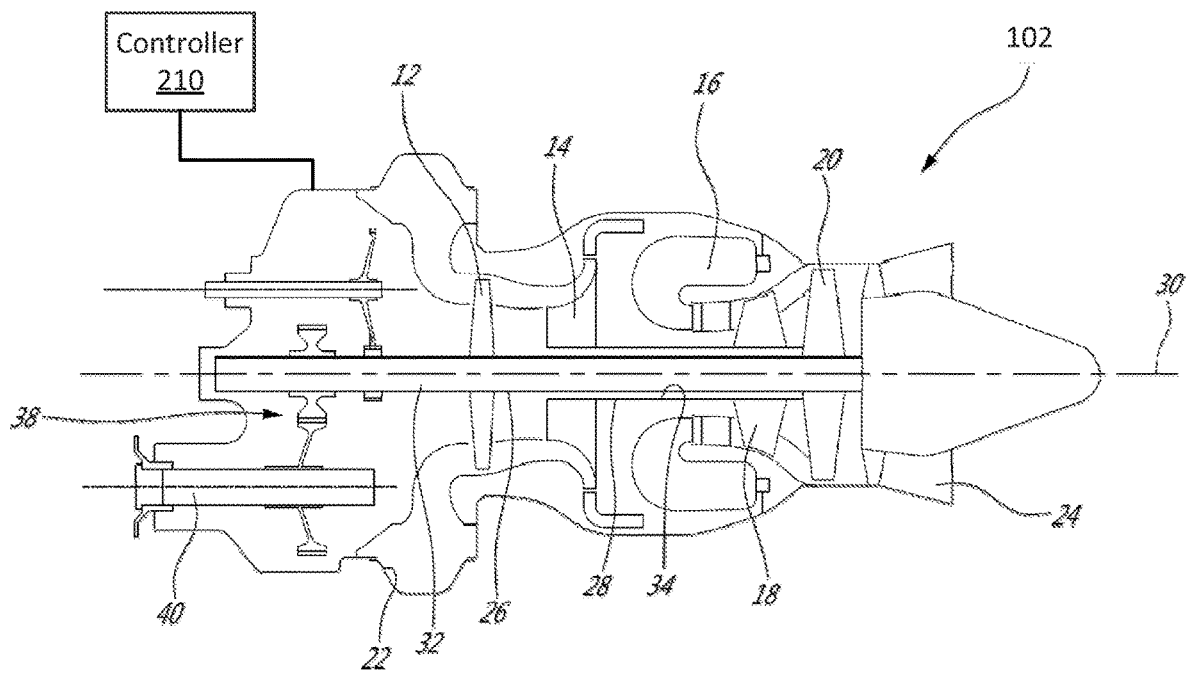
FIG. 2 is a cross-sectional view of an example turboshaft engine of the aircraft of FIG. 1.

With reference to FIG. 2, the turboshaft engines 102, 104 can be embodied as gas turbine engines. Although the foregoing discussion relates to engine 102, it should be understood that engine 104 can be substantively similar to engine 102. In this example, the engine 102 is a turboshaft engine generally comprising in serial flow communication a low pressure (LP) compressor section 12 and a high pressure (HP) compressor section 14 for pressurizing air, a combustor 16 in which the compressed air is mixed with fuel and ignited for generating an annular stream of hot combustion gases, a high pressure turbine section 18 for extracting energy from the combustion gases and driving the high pressure compressor section 14, and a lower pressure turbine section 20 for further extracting energy from the combustion gases and driving at least the low pressure compressor section 12.

The low pressure compressor section 12 may independently rotate from the high pressure compressor section 14. The low pressure compressor section 12 may include one or more compression stages and the high pressure compressor section 14 may include one or more compression stages. A compressor stage may include a compressor rotor, or a combination of the compressor rotor and a compressor stator assembly. In a multistage compressor configuration, the compressor stator assemblies may direct the air from one compressor rotor to the next.

The engine 102 has multiple, i.e. two or more, spools which may perform the compression to pressurize the air received through an air inlet 22, and which extract energy from the combustion gases before they exit via an exhaust outlet 24. In the illustrated embodiment, the engine 102 includes a low pressure spool 26 and a high pressure spool 28 mounted for rotation about an engine axis 30. The low pressure and high pressure spools 26, 28 are independently rotatable relative to each other about the axis 30. The term "spool" is herein intended to broadly refer to drivingly connected turbine and compressor rotors.

The low pressure spool 26 includes a low pressure shaft 32 interconnecting the low pressure turbine section 20 with the low pressure compressor section 12 to drive rotors of the low pressure compressor section 12. In other words, the low pressure compressor section 12 may include at least one low pressure compressor rotor directly drivingly engaged to the low pressure shaft 32 and the low pressure turbine section 20 may include at least one low pressure turbine rotor directly drivingly engaged to the low pressure shaft 32 so as to rotate the low pressure compressor section 12 at a same speed as the low pressure turbine section 20. The high pressure spool 28 includes a high pressure shaft 34 interconnecting the high pressure turbine section 18 with the high pressure compressor section 14 to drive rotors of the high pressure compressor section 14. In other words, the high pressure compressor section 14 may include at least one high pressure compressor rotor directly drivingly engaged to the high pressure shaft 34 and the high pressure turbine section 18 may include at least one high pressure turbine rotor directly drivingly engaged to the high pressure shaft 34 so as to rotate the high pressure compressor section 14 at a same speed as the high pressure turbine section 18. In some embodiments, the high pressure shaft 34 may be hollow and the low pressure shaft 32 extends therethrough. The two shafts 32, 34 are free to rotate independently from one another.

The engine 102 may include a transmission 38 driven by the low pressure shaft 32 and driving a rotatable output shaft 40. The transmission 38 may vary a ratio between rotational speeds of the low pressure shaft 32 and the output shaft 40.

As described hereinabove, control of the operation of the engine 102 can be effected by one or more control systems, for example a controller 210. The controller 210 can modulate a fuel flow rate provided to the engine 102, the position and/or orientation of variable geometry mechanisms within the engine 102, a bleed level of the engine 102, and the like. In some embodiments, the controller 210 is configured for controlling operation of multiple engines, for instance the engines 102 and 104. For example, the controller 210 can be provided with one or more Full Authority Digital Engine Controllers (FADECs) or similar devices. Each FADEC can be assigned to control the operation of one or more of the engines 102, 104. Additionally, in some embodiments the controller 210 can be configured for controlling operation of other elements of the aircraft 100, for instance the main rotor 108.

Figure 3:
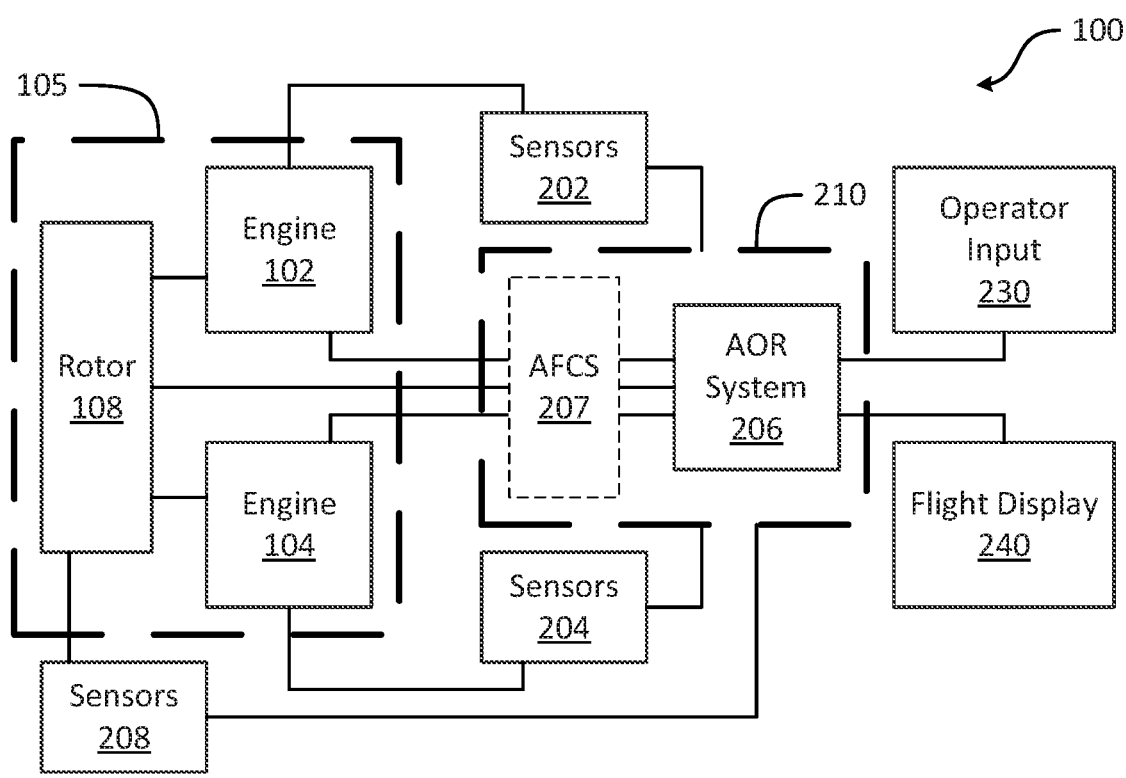
FIG. 3 is a block diagram of an example architecture for operating a rotorcraft.

With reference to FIG. 3, the aircraft 100, comprising the engines 102, 104 and the rotor 108, is illustrated using a block diagram. More than two engines 102, 104 may be present on a same aircraft 100. The engines 102, 104 are mechanically coupled to the main rotor 108, for instance as illustrated in FIG. 1B, for causing the rotor 108 to rotate and produce thrust for the aircraft 100. Although FIG. 3 illustrates a singular rotor 108, it should be noted that the aircraft 100 can include any number of rotors, including multiple main rotors, one or more tail rotors, and the like. Collectively, the engines 102, 104, and the rotor 108 form part of the multi-engine system 105, which is controlled by the controller 210. The controller 210 is configured for receiving various instructions from an operator of the aircraft 100, for example via operator input 230. In addition, various information about the operation of the aircraft 100, for example obtained from the controller 210, can be presented via the flight display 240.

The multi-engine system 105 can be controlled by way of the controller 210, as described hereinabove. The controller 210 can be composed of various devices, including one or more FADEC, one or more rotor controllers, or any other suitable devices for controlling operation of the engines 102, 104, and/or the rotor 108. In some embodiments, the operation of the engines 102, 104, and of the rotor 108 is controlled by way of one or more actuators, mechanical linkages, hydraulic systems, and the like. The controller 210 can be coupled to the actuators, mechanical linkages, hydraulic systems, and the like, in any suitable fashion for effecting control of the engines 102, 104 and/or of the rotor 108. For example, if a change in the operating conditions of the aircraft 100 is detected without any corresponding change in inputs from an operator of the aircraft 100, the FADEC can adjust the inputs to compensate for the uncommanded change.

One or more sensors 202, 204 are coupled to the engines 102, 104, for acquiring data about the operating parameters of the engines 102, 104. Additionally, sensors 208 are coupled to the rotor 108 for acquiring data about the operating parameters of the rotor 108. The sensors 202, 204, 208 may be any suitable type of sensor used to measure operating parameters such as but not limited to speed sensors, acceleration sensors, pressure sensors, temperature sensors, altitude sensors, and the like. The sensors 202, 204, 208, can be coupled to the controller 210 in any suitable fashion, including any suitable wired and/or wireless coupling techniques.

The controller 210 can be provided with an AOR system 206 which is configured to control operation of the engines 102, 104, and of the rotor 108, when the aircraft 100 is operating in the AOR. In certain embodiments, prior to entry into, or exit from, the AOR, various operating parameters for the engines 102, 104, and/or for the rotor 108, must be within predetermined bands and/or at, below, or above certain predetermined values. In some embodiments, when operating in the AOR, one of the engines, for example engine 102, is set as the so-called "active engine", and the other engines, in this example engine 104, is set as the so-called "standby engine". It should be noted that the association between engines 102, 104 and the active/standby status is solely for the purposes of example.

As described hereinabove, when operating in the AOR, the active engine (engine 102) and the standby engine (engine 104) are operated at different output power levels. In the course of operation of the aircraft 100, an operator of the aircraft 100 can seek to enter the AOR, that is to say, to cause the aircraft 100 to begin to operate in the AOR. In some embodiments of the aircraft 100, entry into the AOR is performed substantially entirely by the AOR system 206: the operator requests entry into the AOR, for instance via the operator input 230, and the AOR system 206 performs one or more operations to ensure entry into the AOR is performed. For example, the operations are performed via an automatic flight control system (AFCS) 207 of the controller 210, which is configured for adjusting commands issued to various flight components of the aircraft 100 via the operator input 230. The operator input 230 can include a collective lever input, a cyclic input, a pedal input, and/or any other suitable inputs for controlling operation of the aircraft 100. In some embodiments, the AFCS 207 can adjust the inputs by way of mechanical linkages, actuators, or the like, which adjust the position and/or orientation of various surfaces and mechanical machines. In other embodiments, the AFCS 207 can adjust analog or digital signals transmitted to actuators or other devices which control operation of the engines 102, 104, and/or of the rotor 108. Other approaches are also considered.

In some other embodiments, the operator of the aircraft 100 is required to adjust the operating parameters of the aircraft 100 before entry into the AOR can be performed. For example, in order to enter the AOR, the operator of the aircraft may be required to adjust one or more of the output power level of the multi-engine powerplant 105, the altitude of the aircraft 100, or the like. To assist the operator of the aircraft 100 in preparing the aircraft for entry into the AOR, it is considered to provide one or more visual indicators via the flight display 240 to facilitate the adjustment of the operating parameters of the aircraft 100 to levels conducive to entry into the AOR. It should be noted that the techniques described herein can nevertheless be applied to embodiments in which entry into the AOR is performed automatically via the AOR system 206 and/or the AFCS 207.

The flight display 240 serves to provide various information to the operator of the aircraft 100. Although shown here as a singular flight display 240, it should be understood that the flight display 240 can be composed of a variety of flight displays, which can include dials, gauges, screens, and the like. For example, the flight display 240 can include one or more primary flight displays, one or more multi-function displays, and the like. The information displayed to the operator of the aircraft 100 can include one or more of: an airspeed of the aircraft 100, a groundspeed of the aircraft 100, a heading of the aircraft 100, a pitch angle of the aircraft 100, an output power of the engines 102, 104, a shaft horsepower (or "SHP") of the engines 102, 104, an output torque of the engines 102, 104, a gear ratio of the multi-engine powerplant 105, or any other suitable information.

To facilitate the adjustment of the operating parameters of the aircraft to levels conducive to entry into the AOR, it is considered that the controller 210, for example via the AOR system 206, can determine values or ranges of values for certain operating parameters of the aircraft, for example various measures of engine output power, which are compatible with entry into the AOR, referred to herein as "target ranges". Although the foregoing discussion focuses on the notion of target ranges, it should be understood that the target ranges considered in the present application include ranges which are less-than a particular value (i.e., from 0 to the particular value), ranges which are greater-than a particular value (i.e., from the particular value to an unspecified maximum), ranges which include only a particular value (e.g., a range from 50 to 50), or any other suitable type of range. In some embodiments, the measures of engine output power include one or more indicators of the output of the engines 102, 104, for example an output power, an output torque, an output shaft horsepower or rotational speed, or the like. The target range can be determined for each of the engines 102, 104, or for the multi-engine powerplant 105 collectively.

Using output power of the engines 102, 104 as an example, entry into the AOR is possible when the output power of the engine 102, 104, is within a particular target range. For example, entry into the AOR requires the output power of the engines 102, 104 to be between a target range of 40% and 60% of a rated maximum power output for the engines 102, 104. The AOR system 206 can be preprogrammed or otherwise provided with an indication of the target range(s). In another example, entry into the AOR requires the internal temperature of the engines 102, 104 to be below a particular value determined based on an ambient temperature of the surroundings of the aircraft 100. The AOR system 206 can be programmed with an algorithm, schedule, or the like, to dynamically assess an upper bound for the internal temperature of the engines 102, 104, and to define a target range based on the upper bound. It should be understood that the values and specifics used in this example, and in forthcoming examples, are merely for the purposes of illustration, and should not be interpreted as limiting.

In this fashion, the AOR system 206 can be provided with one or more preprogrammed target ranges for certain operating parameters of the aircraft 100, including of the multi-engine powerplant 105, compatible with entry to the AOR. Additionally, or in the alternative, the AOR system 206 can be provided with algorithms, schedules, or other computational methods for dynamically assessing and determining one or more target ranges. In some embodiments, the AOR system 206 can acquire information from various sensors, including the sensors 202, 204, and 208, and any other suitable sensors. For example, the AOR system 206 can obtain information relating to one or more of output power, torque, and/or rotational speed of engines 102, 104; speed reference and/or coupling state of the rotor 108; ambient pressure and/or temperature; airspeed, groundspeed, altitude, attitude (or rotorcraft pitch), flight regime, fluid levels, aircraft load, engine power extraction (e.g. bleed air levels, electrical load, etc.), availability status of a rotorcraft electrical power system, autopilot health status, torque limiter selection, and the like, in order to dynamically assess and determine suitable target ranges.

In some embodiments, the AOR system 206 can optionally perform a safety check of the engines 102, 104 prior to, or during, determination of target ranges for the operating parameters compatible with entry into the AOR. If the safety check indicates that the AOR cannot safely be entered into, the AOR system 206 can refuse entry into the AOR, and the determination of target ranges can be omitted. If the safety check confirms that entry into the AOR can be performed safely, or if no safety check is performed, the AOR system 206 can then determine one or more target ranges for operating parameters of the aircraft 100.

In some embodiments, the AOR system 206 performs the determination of the target ranges when certain conditions are met, or in response thereto. For example, the AOR system 206 can delay performing the determination of the target ranges until the aircraft 100 reaches a minimum airspeed, a minimum altitude, or the like. In another example, the AOR system 206 performs the determination of the target ranges in response to a particular event, for example the aircraft 100 reaching a particular portion of a flight mission plan, or the like.

In some embodiments, entry into the AOR requires a particular operating parameter to be located in a target range. For example, entry into the AOR requires a power output of the multi-engine powerplant 105 to be within a particular target range. In some other embodiments, entry into the AOR requires multiple operating parameters to be located in respective target ranges. For example, entry into the AOR requires the power output of the multi-engine powerplant 105 to be within a first target range, the internal temperature of the engines 102, 104 to be within a second target range, and an altitude of the aircraft 100 to be within a third target range. It should be noted that any suitable number of target ranges for corresponding operating parameters of the aircraft 100 can be established to facilitate entry into the AOR, and that references to singular target ranges and operating parameters in the foregoing discussion does not preclude the use of multiple target ranges for corresponding operating parameters.

It should be noted that although the foregoing description primarily discloses embodiments in which the aircraft 100 includes two engines, namely engines 102, 104, similar techniques can be applied to aircraft 100 which include a greater number of engines. For example, an aircraft with four engines can operate in the AOR with two active engines and two standby engines; target ranges can be presented for any suitable number of engines using substantially similar steps. In another example, an aircraft with three engines can operate in the AOR with one active engine and two standby engines. Other approaches, and other configurations with other numbers of engines, are also considered. Generally, a first group of engines provides a majority of the motive power for the aircraft 100, and a second group of the engines provides a minority of the motive power.

Once the target range for the operating parameter is determined, a graphical representation of the target range can be produced for presentation to an operator of the aircraft 100, for instance via the flight display 240. The target range can be produced as a numerical value, via a textual indication, or via one or more graphical elements. In some embodiments, the target range is displayed for each of the engines 102, 104, as separate graphical representations, so that each of the engines 102, 104, is provided with a respective associated target range and graphical representation thereof.

Figure 4A:
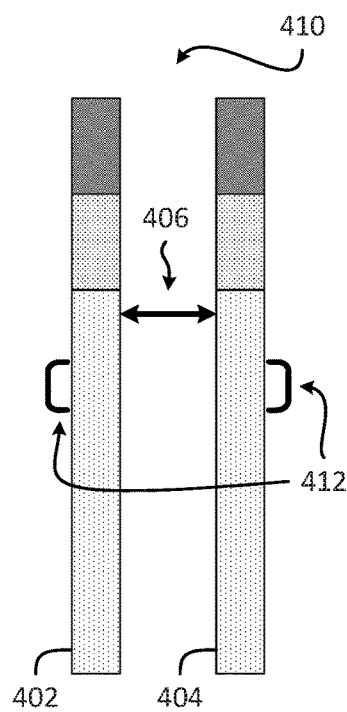
FIGS. 4A-C are example graphical representations of operating parameters of the aircraft of FIG. 1A.
Figure 4B:
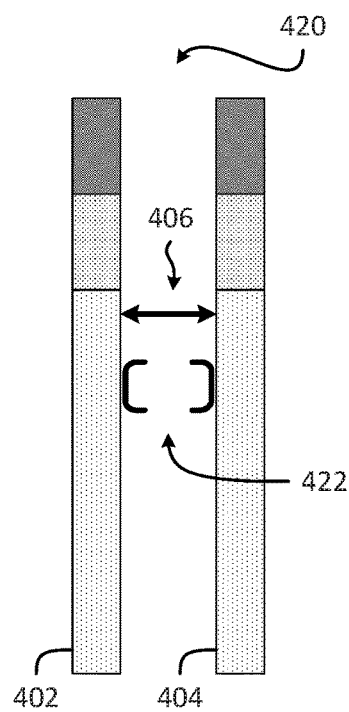
Figure 4C:
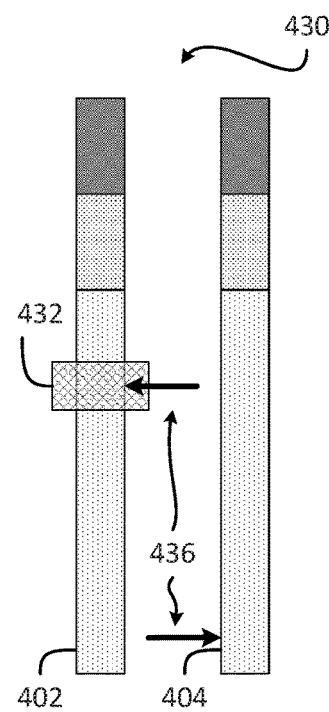

With additional reference to FIGS. 4A-C, in some embodiments, the graphical representation of the target range is displayed in proximity to, or overlaid over, a graphical representation of the associated operating parameter. For example, in FIG. 4A, the flight display 240 can produce a graphical representation 410 of an output power of the engines 102, 104. In this example, bar 402 illustrates the output power of the engine 102, and bar 404 illustrates the output power of the engine 104. The bars 402, 404 are a linear representation of the power output of the engines 102, 104, with the bottommost end indicating low or no power output, and the topmost end indicating high or maximum power output.

The bars 402, 404 are divided into different portions, which can produce different graphical elements (e.g. colour) to symbolize the amount of strain experienced by the engines 102, 104. For instance, the bottom portion can be coloured green to indicate low strain on the engine 102, 104, the middle portion can be coloured yellow to indicate middling strain on the engines 102, 104, and the top portion can be coloured red to indicate high strain on the engines 102, 104. An indicator 406 is provided to illustrate a current output power level of the engines 102, 104. The indicator 406 can be produced using any suitable graphical elements. For example, the indicator 406 can be produced in a colour or a tone which contrasts with the colours used for the bars 402, 404. Although not illustrated here, it is considered that the graphical representation 410 could include numerical indicators or the like to quantify the power output of the engines 102, 104.

In addition, a target range indicator 412 is provided to serve as a graphical representation of the target range for the output power of the engines 102, 104. The target range indicator 412 can be shaped as a pair of brackets to illustrate the upper and lower bounds of the target range. In some embodiments, the target range indicator 412 can be produced with a graphical element which differs from those used to produce the bars 402, 404. For example, the colour used to produce the target range indicator 412 can be different from the colours used to produce the bars 402, 404. In another example, a pattern or visual texture of the target range indicator differs from those used for the bars 402, 404. For instance, the colour, pattern, and/or visual texture used to produce the target visual indicator 412 can be selected to contrast with those used for the bars 402, 404, or to contrast with other elements produced via the flight display 420.

In FIG. 4B, graphical representation 420 of the output power of the engines 102, 104 is provided in which a target range indicator 422 is disposed between the bars 402, 404. The target range indicator 422 can be presented using any suitable graphical elements, for instance to contrast with the graphical elements used for the bars 402, 404. Other configurations for the target visual indicators are also considered.

With reference to FIG. 4C, in some embodiments the graphical representation of the target range can varied once the aircraft has entered into the AOR. In the embodiment of FIG. 4C, the aircraft 100 is operating in the AOR, with engine 102 as the active engine and engine 104 as the standby engine, and the flight display 240 displays a graphical representation 430 of the output power of the engines 102, 104. As a result, indicator 436 is split in two components: one component for the active engine 102, which indicates a power level near a midpoint of bar 402, and one component for the standby engine 104, which indicates a low power level near the bottom of bar 404.

In order to assist the pilot in maintaining the operating parameters of the aircraft 100 within the target range for continued operation in the AOR, a target range indicator 432 can be produced as overlaid on the bar 402, which is associated with the active engine 102. The component of the indicator 436 associated with the bar 402 can be displayed over the target range indicator 432, to reduce operator strain in reading the graphical representation 430. In some embodiments, the target range indicator 432 can be produced as a transparent or semi-transparent box, as shown in FIG. 4C. For example, the target range indicator 432 can be produced as a semi-transparent box of a different colour than the bar 402, or with a different colour than the portion of the bar 402 over which the target range indicator 432 is overlaid. Other approaches are also considered.

With continued reference to FIG. 3, in some embodiments the AOR system 206 is configured for modifying the graphical representation of the target range dynamically and/or in real-time. For example, changes to certain operating parameters of the aircraft 100 can result in a change to a dynamically-determined target range for another operating parameter. As a result, the AOR system 206 is configured for monitoring changes to the operating parameters of the aircraft, including via the sensors 202, 204, 208, and via other components of the controller 210, and for determining updated target ranges based on the changes to the operating parameters of the aircraft. Once the updated target ranges have been determined, the AOR system 206 can communicate with the flight display 240 to update the graphical representation of the target ranges, as appropriate. For instance, and with additional reference to FIG. 4A, the target range indicator 412 can be moved up or down relative to the bars 402, 404, in response to changes to the target range for the output power of the engines 102, 104.

It should be understood that the examples discussed in conjunction with FIGS. 4A-C are for the purpose of illustration, and that variations to the target range indicators 412, 422, 432 are considered.

Figure 5:
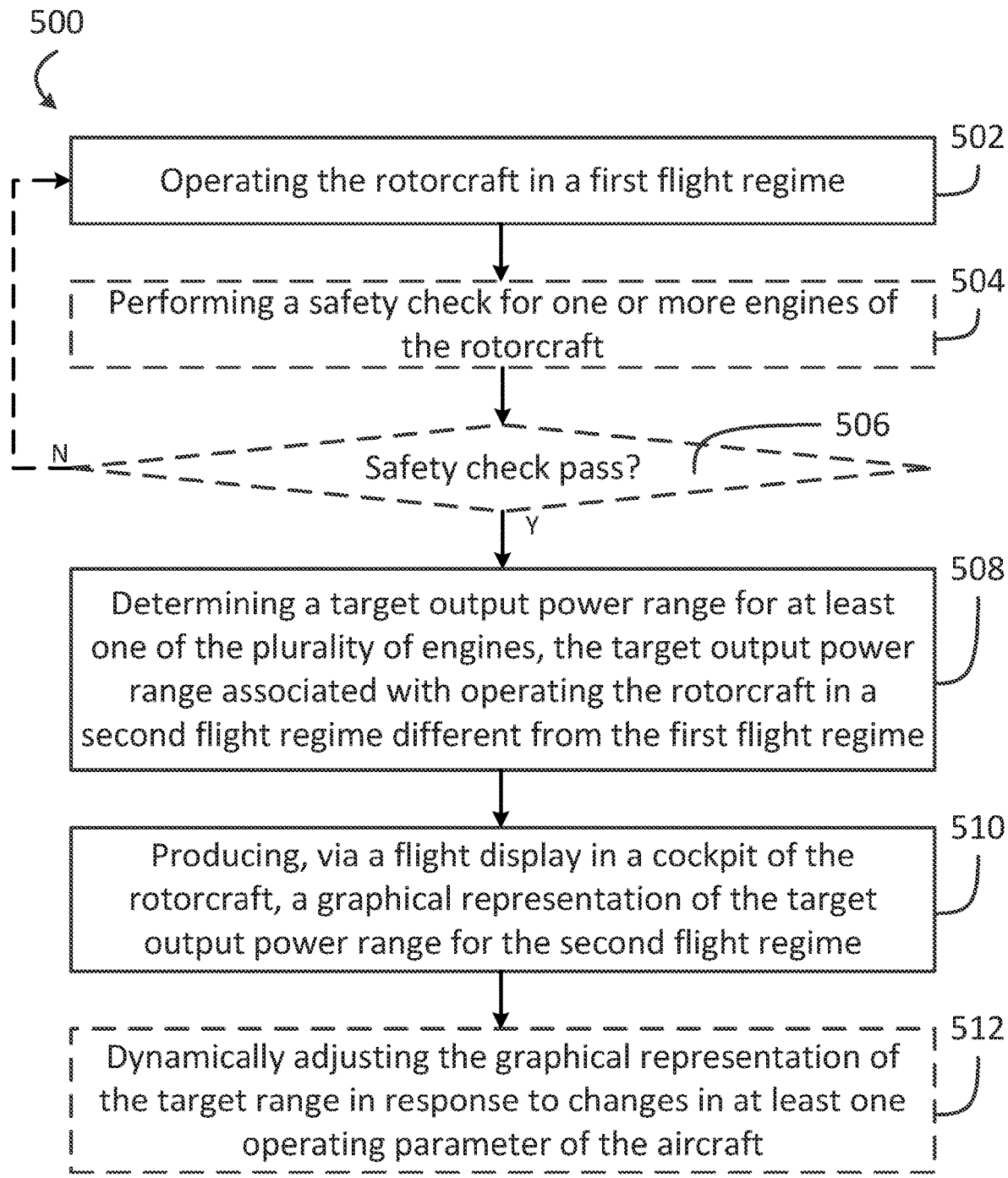
FIG. 5 is a flowchart of an example method for operating a rotorcraft.

With reference to FIG. 5, a method 500 for operating a rotorcraft, for example the aircraft 100, is provided. The aircraft 100 includes a plurality of engines configured to provide motive power to the aircraft 100, for instance the engines 102, 104, forming part of the multi-engine powerplant 105. At step 502, the aircraft 100 is operated in a first flight regime. The first flight regime can be any suitable flight regime which differs from the AOR. For example, the first flight regime can be a flight regime in which both engines 102, 104 provide a substantially equal proportion of the motive power of the aircraft 100, or any other suitable flight regime.

Optionally, at step 504, a safety check for the engines 102, 104 is performed. The safety check can relate to any suitable operating parameters relating to the engines 102, 104, and in certain cases, to any suitable operating parameters relating to the aircraft 100. At decision step 506, a determination is made regarding whether the safety check was considered a pass (i.e., whether the safety check indicated safe operating conditions for entering the AOR). When the safety check does not pass, the method 500 can return to some previous step, for instance step 502, or can exit and inform the operator of the aircraft 100 that the AOR cannot safely be entered into. When the safety check does pass, the method 500 can move to step 508.

At step 508, a target output power range for is determined for at least one of the engines 102, 104. The target output power range is indicative of values for one or more measures of the output power of the engines 102, 104 which are associated with operating the aircraft 100 in the AOR, that is to say, which are suitable for entry into the AOR and/or for maintaining the aircraft 100 in the AOR. In some embodiments, the target output power range is based on predetermined values for the output power of the engines 102, 104. In some other embodiments, the target output power range is determined dynamically based on other operating parameters of the aircraft 100. In addition, in certain cases step 508 consists in determining target ranges for a plurality of operating parameters of the aircraft 100. It should be noted that in certain cases, step 508 additionally consists in determining target ranges for operating parameters of the aircraft 100 beyond the power output parameters of the engines 102, 104.

At step 510, a graphical representation of the target output power range is produced via a flight display, for example the flight display 240, which can be located in a cockpit of the aircraft 100. In some embodiments, the target output power range is produced proximate to, or overlaid on, an associated graphical representation of the operating parameter to which the target output power range relates. The graphical representation of the target output power range can be produced using any suitable graphical elements, including colour, tone, texture, transparency, and the like, which can be selected to contrast with other graphical representations produced via the flight display 240.

Optionally, at step 512, the graphical representation of the target range can be dynamically adjusted, for instance in response to changes in one or more of the operating parameters of the aircraft 100. For example, changes in the ambient temperature in the vicinity of the aircraft 100 can cause a change in the target output power range, which relates to an internal temperature of the engines 102, 104. When a change in the ambient temperature in the vicinity of the aircraft 100 is detected, the target output power range can be adjusted, and the graphical representation of the target output power range as produced via the flight display 240 can be adjusted.

Figure 6:
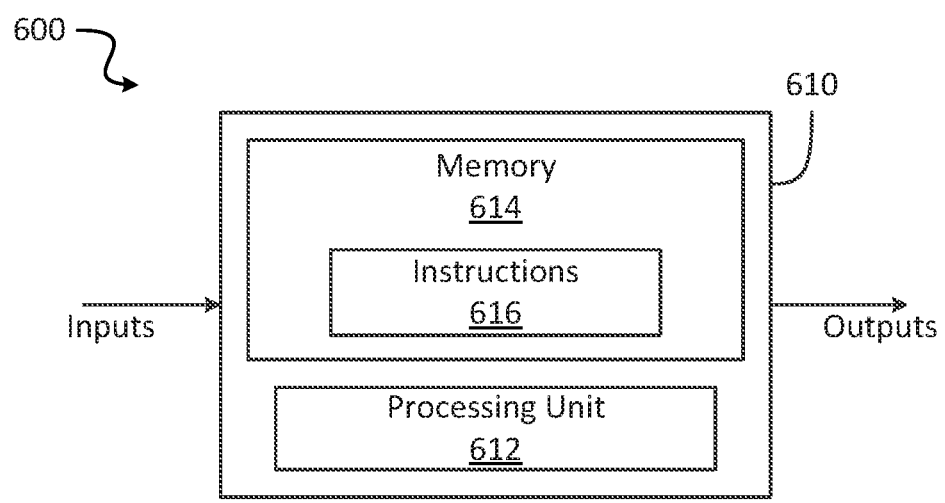
FIG. 6 is a block diagram of an example computing device for implementing the method of FIG. 5.

With reference to FIG. 6, the method 500 may be implemented by a computing device 610, which can embody part or all of the controller 210, the AOR system 206, and/or the AFCS system 207. The computing device 610 comprises a processing unit 612 and a memory 614 which has stored therein computer-executable instructions 616. The processing unit 612 may comprise any suitable devices configured to implement the functionality of the AOR system 206 and/or the functionality described in the method 500, such that instructions 616, when executed by the computing device 610 or other programmable apparatus, may cause the functions/acts/steps performed by the AOR system 206 and/or described in the method 500 as provided herein to be executed. The processing unit 612 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, custom-designed analog and/or digital circuits, or any combination thereof.

The memory 614 may comprise any suitable known or other machine-readable storage medium. The memory 614 may comprise non-transitory computer readable storage medium, for example, but not limited to, an electronic, magnetic, optical, electromagnetic, infrared, or semiconductor system, apparatus, or device, or any suitable combination of the foregoing. The memory 614 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 614 may comprise any storage means (e.g., devices) suitable for retrievably storing machine-readable instructions 616 executable by processing unit 612.

The methods and systems for operating a rotorcraft as described herein may be implemented in a high level procedural or object oriented programming or scripting language, or a combination thereof, to communicate with or assist in the operation of a computer system, for example the computing device 610. Alternatively, the methods and systems described herein may be implemented in assembly or machine language. The language may be a compiled or interpreted language.

Embodiments of the methods and systems described herein may also be considered to be implemented by way of a non-transitory computer-readable storage medium having a computer program stored thereon. The computer program may comprise computer-readable instructions which cause a computer, or more specifically the processing unit 612 of the computing device 610, to operate in a specific and predefined manner to perform the functions described herein, for example those described in the method 500.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the present disclosure. Still other modifications which fall within the scope of the present disclosure will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for operating a rotorcraft comprising a first engine and a second engine configured to provide motive power to the rotorcraft, the method comprising:

operating the rotorcraft in a first flight regime in which both the first engine and the second engine provide the motive power to the rotorcraft;

when the rotorcraft is operating in the first flight regime:
  receiving a request for entering into a second flight regime in which the first engine is operated in an active mode to provide the motive power to the rotorcraft and the second engine is operated in a standby mode to provide substantially no motive power to the rotorcraft;
  determining a first target output power range and a second target output power range for the operation of the first engine and the second engine respectively in the first flight regime and that are compatible with entry into the second flight regime;
  producing, via a flight display in a cockpit of the rotorcraft, a first graphical representation of the first target output power range required in the first flight regime by the first engine for entry into the second flight regime, and a second graphical representation of the second target output power range required in the first flight regime by the second engine for entry into the second flight regime; and
  when an operation of rotorcraft in the first flight regime meets the first target output power range for the first engine and the second target output power range for the second engine for entry into the second flight regime, causing the rotorcraft to enter the second flight regime.

2. The method of claim 1, wherein producing the first graphical representation of the first target output power range comprises overlaying the first graphical representation of the first target output power range on an associated graphical representation of a power output parameter associated with the first target output power range.

3. The method of claim 2, wherein the graphical representation of the power output parameter is displayed with a first graphical feature, and wherein overlaying the first graphical representation of the first target output power range comprises displaying the first graphical representation of the first target output power range with a second graphical feature distinct from the first graphical feature.

4. The method of claim 1, wherein producing the first graphical representation of the first target output power range comprises juxtaposing the first graphical representation of the first target output power range to an associated graphical representation of a power output parameter associated with the first target output power range.

5. The method of claim 1, wherein producing the first graphical representation of the first target output power range comprises producing the first graphical representation of the first target output power range on a flight display associated with the first engine and the second engine.

6. The method of claim 1, further comprising:
  performing a safety check for the first engine and the second engine, and wherein the determining of the first target output power range and the second target output power range is performed responsive to the performing of the safety check; and
  when the safety check indicates that the second flight regime cannot safely be entered, refusing entry into the second flight regime.

7. The method of claim 1, wherein the producing of the first graphical representation of the first target output power range is performed responsive to the rotorcraft reaching one of a predetermined altitude and a predetermined stage of a flight mission.

8. The method of claim 1, wherein the producing of the first graphical representation of the first target output power range and the second graphical representation of the second target output power range is performed responsive to the first engine and the second engine producing the motive power above a predetermined threshold.

9. The method of claim 1, wherein determining the first target output power range comprises determining the first target output power range for one or more of an output power of the first engine, an output torque of the first engine, an output shaft speed of the first engine, and an internal temperature of the first engine.

10. The method of claim 1, further comprising dynamically adjusting the first graphical representation of the first target output power range in response to changes in operating parameters of the rotorcraft.

11. The method of claim 1, comprising:
after causing the rotorcraft to enter the second flight regime, operating the rotorcraft in the second flight regime; and
when operating the rotorcraft in the second flight regime, producing, via the flight display in the cockpit of the rotorcraft, another representation of a target output power range required for continuing operation in the second flight regime.

12. The method of claim 1, wherein the first target output power range and the second target output power range are between 40% and 60% of a rated maximum power output for the first engine and the second engine respectively.

13. A system for operating a rotorcraft comprising a first engine and a second engine configured to provide motive power to the rotorcraft, the system comprising:
a processor; and
a non-transitory computer-readable medium having stored thereon program instructions executable by the processor for:
operating the rotorcraft in a first flight regime in which both the first engine and the second engine provide the motive power to the rotorcraft;
when the rotorcraft is operating in the first flight regime:
receiving a request for entering into a second flight regime in which the first engine is operated in an active mode to provide the motive power to the rotorcraft and the second engine is operated in a standby mode to provide substantially no motive power to the rotorcraft;
determining a first target output power range and a second target output power range for the operation of the first engine and the second engine respectively in the first flight regime and that are compatible with entry into the second flight regime;
producing, via a flight display in a cockpit of the rotorcraft, a first graphical representation of the first target output power range required in the first flight regime by the first engine for entry into the second flight regime, and a second graphical representation of the second target output power range required in the first flight regime by the second engine for entry into the second flight regime; and
when an operation of rotorcraft in the first flight regime meets the first target output power range for the first engine and the second target output power range for the second engine for entry into the second flight regime, causing the rotorcraft to enter the second flight regime.

14. The system of claim 13, wherein producing the first graphical representation of the first target output power range comprises overlaying the first graphical representation of the first target output power range on an associated graphical representation of a power output parameter associated with the first target output power range.

15. The system of claim 14, wherein the graphical representation of the power output parameter is displayed with a first graphical feature, and wherein overlaying the first graphical representation of the first target output power range comprises displaying the first graphical representation of the first target output power range with a second graphical feature distinct from the first graphical feature.

16. The system of claim 13, wherein producing the first graphical representation of the first target output power range comprises juxtaposing the first graphical representation of the target output power range to an associated graphical representation of a power output parameter associated with the first target output power range.

17. The system of claim 13, wherein producing the first graphical representation of the first target output power range comprises producing the first graphical representation of the first target output power range on a flight display associated with the first engine and the second engine.

18. The system of claim 13, wherein the program instructions are further executable for performing a safety check for the first engine and the second engine, and wherein the determining of the first target output power range is performed responsive to the performing of the safety check.

19. The system of claim 13, wherein the producing of the first graphical representation of the first target output power range is performed responsive to the rotorcraft reaching one of a predetermined altitude and a predetermined stage of a flight mission.

20. The system of claim 13, wherein the producing of the first graphical representation of the first target output power range and the second graphical representation of the second target output power range is performed responsive to the first engine and the second engine producing the motive power above a predetermined threshold.

* * * * *